US009628690B2

(12) United States Patent
Fisher et al.

(10) Patent No.: US 9,628,690 B2
(45) Date of Patent: Apr. 18, 2017

(54) CAMERA CONTROLLER WITH CONTEXT-SENSITIVE INTERFACE

(71) Applicant: GoPro, Inc., San Mateo, CA (US)

(72) Inventors: Ken Fisher, Los Angeles, CA (US); Kevin Baxter, Glendale, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/918,472

(22) Filed: Oct. 20, 2015

(65) Prior Publication Data
US 2016/0112623 A1    Apr. 21, 2016

Related U.S. Application Data

(60) Provisional application No. 62/066,382, filed on Oct. 21, 2014.

(51) Int. Cl.
*H04N 5/232* (2006.01)
*H04N 5/225* (2006.01)
*H04N 101/00* (2006.01)

(52) U.S. Cl.
CPC ....... *H04N 5/23203* (2013.01); *H04N 5/2252* (2013.01); *H04N 5/2253* (2013.01);
(Continued)

(58) Field of Classification Search
CPC .............. G01M 99/005; F02D 41/1495; H04L 12/2823; G06F 11/2294; F23N 5/24; F23N 2031/20; G03B 17/561; G03B 17/563
See application file for complete search history.

(56) References Cited

U.S. PATENT DOCUMENTS 5,627,531 A * 5/1997 Posso ............. G06F 3/0362
                                                    341/20
6,593,914 B1* 7/2003 Nuovo ............ G06F 1/1626
                                                    341/22
(Continued)

FOREIGN PATENT DOCUMENTS

CN      203950109 U      11/2014
CN      104656684 A       5/2015

OTHER PUBLICATIONS

HeliPal.com, "Feiyu G4 QD Handheld Stabilizer for GoPro (3Axis)," 32 pages, [online] [retrieved on Feb. 17, 2016] Retrieved from the internet <URL: http://www.helipal.com/handheldgoprostabilizer3axis.Html>.
(Continued)

*Primary Examiner* — Jason Flohre
(74) *Attorney, Agent, or Firm* — Fenwick & West LLP (57) ABSTRACT

A handheld device is communicatively coupled with a camera. The handheld device includes a mounting feature connecting the camera, or housing thereof, to the handheld device. Specifically, the mounting feature includes inner locking portions to engage with the camera, or housing. The handheld device further includes a handle housing to secure at least a rotating membrane and a communication subsystem. The rotating membrane includes multiple switches. The handheld device receives a selection of a switch from a user of the handheld device. The handheld device conducts a lookup in a lookup table for a setting mapped to the selected switch. The communication subsystem transmits a command to the camera, the command including the setting.

16 Claims, 5 Drawing Sheets

(52) U.S. Cl.
CPC ..... *H04N 5/23206* (2013.01); *H04N 5/23245* (2013.01); *H04N 2101/00* (2013.01)

(56) References Cited

U.S. PATENT DOCUMENTS

| | | | |
|---|---|---|---|
| 7,204,650 B2 | 4/2007 | Ghanouni et al. | |
| 7,217,044 B1 | 5/2007 | Marks | |
| 7,298,311 B2* | 11/2007 | Horie | G06F 3/0231 340/815.78 |
| 7,440,767 B2* | 10/2008 | Ballay | G06F 3/0231 455/41.2 |
| 7,936,984 B2 | 5/2011 | Greb et al. | |
| 2009/0003822 A1* | 1/2009 | Tyner | F16M 11/32 396/428 |
| 2009/0179854 A1* | 7/2009 | Weber | G06F 1/1626 345/156 |
| 2009/0190916 A1* | 7/2009 | Sharp | G03B 17/02 396/425 |
| 2014/0354839 A1* | 12/2014 | Yu | H04N 5/23203 348/211.99 |

OTHER PUBLICATIONS

LanParte, "Handheld 3-axis gimbal for smartphone—HHG-01", Hongkong Lanparte Technology Limited, 9 pages, [online] [retrieved on Mar. 24, 2016] Retrieved from the internet <URL:http://www.lanparte.com/html/Accessories_260.html>.

PCT International Search and Written Opinion for PCT/US2015/056771, Jan. 19, 2016, 12 Pages.

* cited by examiner

| | 1st Side<br>Photo | 2nd Side<br>Video | 3rd Side<br>Multi-Shot | 4th Side<br>Playback | 5th Side<br>Setup |
|---|---|---|---|---|---|
| Switch 1 | Auto Shutter, 12MP, Auto WB, Default Color, Default ISO, Default Sharpness, Default EV COMP | 4K SuperView, Medium FOV, Auto Low Light | Burst Capture, 30 photos/1 sec, 12MP | Jump 5 Files While Navigating | Pair |
| Switch 2 | Auto Shutter, 12 MP, 3000K White Balance, 100 ISO | 2.7K SuperView, Medium FOV, Turn Off Low Light | Burst Capture, 10 photos/2 sec, 12MP, Turn On Spot Meter | Jump 10 Files While Navigating | Turn On Touch Display, Up Orientation |
| Switch 3 | 12 MP, 400 ISO, Medium Sharpness, +1.0 EV COMP | 1080p, Ultra Wide FOV, Turn On Spot Meter, 20 Min Looping | Timelapse, Auto Shutter, 2 Sec Interval, 7MP | Playback Last 10 sec | Turn Off LEDs, Turn Off Beeps |
| Switch 4 | 6500K WB, 200 ISO, +1.5 EV COMP | 720p, Ultra Wide FOV, Turn Off Spot Meter, 5 Min Looping | Night Lapse, 30 Sec Shutter, 60 Sec Interval, 12MP | Playback Last 20 sec | Turn On Touch Display, PAL Video Format |
| Switch 5 | Auto Shutter, 5500K WB, 800 ISO | 4K, Turn On Low Light, 5500K WB, 800 ISO | Time Lapse, Auto Shutter, 12MP, 3000K, Low Sharpness | Tag Video | Delete All |
| Switch 6 | Auto Shutter, 7MP, 3200 ISO, -0.5 EV COMP | 1080p, 3200 ISO, -0.5 EV COMP | Night Lapse, 30 Sec Shutter, 12MP, ISO 400, +2 EV COMP | Share Tagged Video | Format Memory Card |
| Switch 7 | User Setting 1 | User Setting 1 | User Setting 1 | User Setting 1 | User Setting 1 |
| Switch 8 | User Setting 2 | User Setting 2 | User Setting 2 | User Setting 2 | User Setting 2 |
| Switch 9 | Camera On/Off | Camera On/Off | Camera On/Off | Camera On/Off | Camera On/Off |
| Trigger | Capture | Start/Stop | Start/Stop | Start/Stop | |

LUT 214

CAMERA CONTROLLER WITH CONTEXT-SENSITIVE INTERFACE

CROSS REFERENCE TO RELATED APPLICATIONS

This application claims the benefit of U.S. Provisional Application No. 62/066,382, filed Oct. 21, 2014, which is incorporated by reference in its entirety.

BACKGROUND

1. Field of Art

The disclosure generally relates to the field of camera controllers, for example camera controllers to remotely configure and operate a camera.

2. Description of the Related Art

A compact camera designed for capturing action while being immersed in it often includes limited user input buttons. For example, the camera can include a single select button for the user to use to navigate complex configuration menus and settings of the camera. The camera includes a multiple of modes (e.g., photo, video, multi-shot, playback, setup, etc.), each mode including several settings, and each setting including further settings. The camera can enable users to configure the modes and settings using layered menus (i.e., menus within menus). For example, configuring the camera to capture a photo in a specific manner can require the user of to jump through several layered menus. The user of the camera first selects a photo mode, then selects a capture mode (e.g., single, continuous or night), then configures the quality of the photo (e.g., 12 megapixels, 7 megapixels or 5 megapixels), then configures metering options (e.g., spot metering), then selects and configures advanced settings (e.g., white balance, color, ISO, sharpness, exposure values, etc.). The user of the camera navigates through several layered menus to capture a single, 12 megapixels, spot metered photo with a white balance of 5500K, flat color profile, 3200 ISO limit, medium sharpness and +1.0 exposure value compensation. Navigating through layered menus in this manner does not enable the user to quickly select and apply settings to capture a scene.

The camera includes features, such as wireless communication capabilities, previously unavailable in action cameras. The incorporation of wireless communication capabilities into cameras enables devices to communicatively couple with the cameras. For example, a user can operate a device communicatively coupled with a camera to remotely configure the camera. If the device were to have a single select button, the user would have to navigate through several layered menus to select and configure settings of the camera. A device with a single button does not enable a user of the device to quickly select and apply settings of a communicatively coupled camera.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

FIG. 3 illustrates a lookup table mapping sides and switches of a rotating membrane of a handheld device to settings of a camera, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system (and method and computer readable storage medium) includes remotely configuring and operating a camera via a handheld device. The handheld device is communicatively coupled with the camera, e.g., via a wireless connection. The handheld device includes a mounting feature connecting the camera, or housing thereof, to the handheld device. Specifically, the mounting feature includes inner locking portions to engage with the camera, or housing. The handheld device further includes a handle housing to secure at least a rotating membrane and a communication subsystem. The rotating membrane includes multiple switches. The handheld device receives a selection of a switch from a user of the handheld device. By way of example, the handheld device conducts a lookup in a lookup table for a setting mapped to the selected switch. The communication subsystem transmits a command to the camera, the command including the setting. In this manner, the user of the handheld device quickly configures specific settings of the communicatively coupled camera.

Camera Controller System

Figure 1:
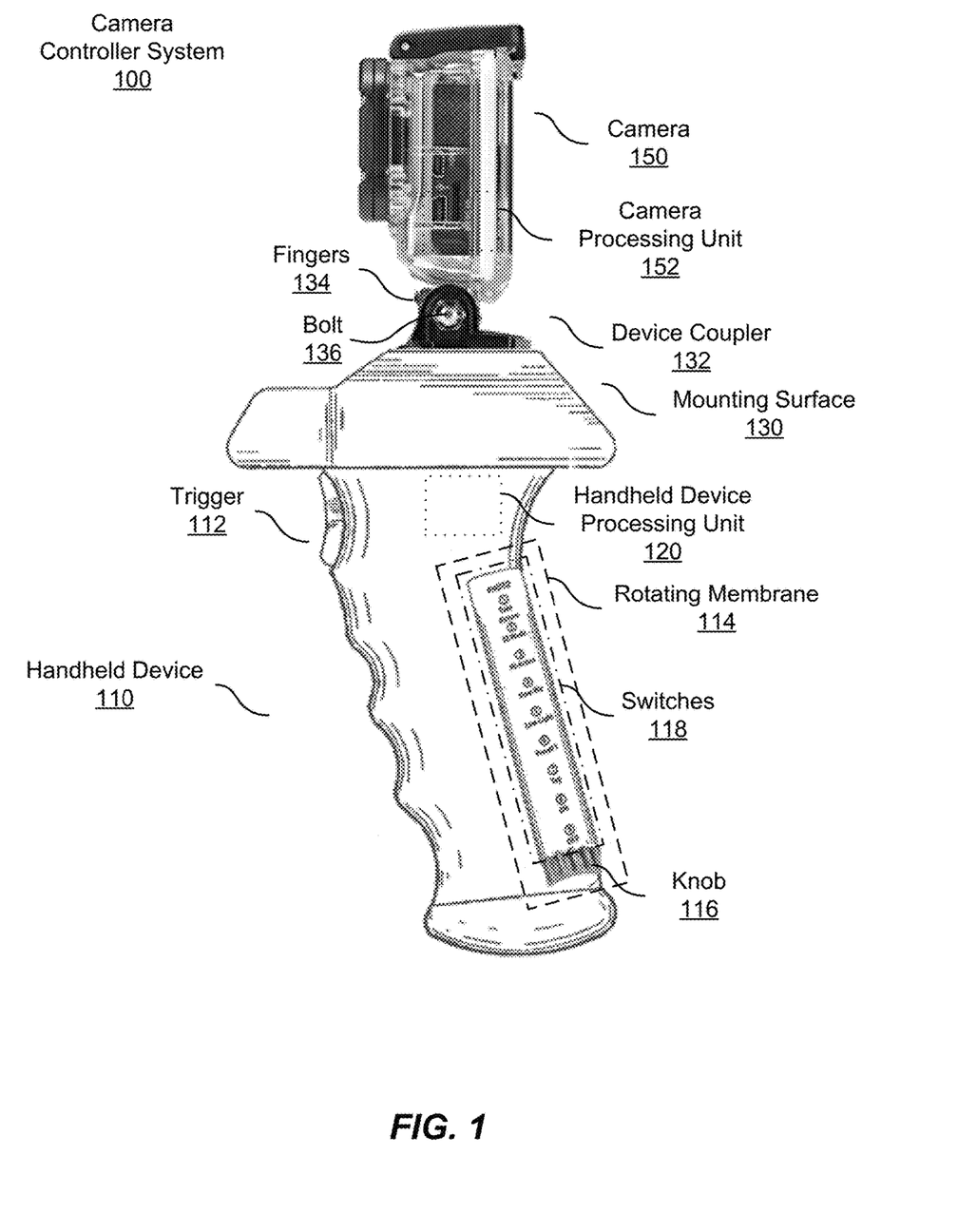
FIG. 1 illustrates camera controller system including a handheld device coupled with a camera, according to one embodiment.

Referring now to FIG. 1, it illustrates a camera controller system 100 including a handheld device 110 coupled with a camera 150, according to one embodiment. The handheld device 110 enables a user to remotely configure and operate the camera 150 using programmable switches (or buttons). The handheld device 110 can be shockproof and/or waterproof. For example, the internal of the handheld device 110 can be structured with padded foam to absorb shock vibration. Further by way of example, the handheld device 110 can include waterproof seals at any opening areas and/or at membranes (e.g., rotating membrane 114) that prevents passage of liquid. The handheld device 110 includes a handheld device processing unit 120, a mounting surface 130, a trigger 112, and a rotating membrane 114. The handheld processing unit 120 includes, for example, one or more processors (and/or controllers), memory (and/or a cache) and communication subsystems. The communication subsystems include, for example, a data bus, and input/output communication circuitry (e.g., wireless and/or wired communication). The handheld processing unit 120 can also include a power source (e.g., batteries) or be coupled with a power subsystem.

The handheld device processing unit 120 and the camera processing unit 152 communicatively couple the handheld device 110 and the camera 150. The handheld device 110 and the camera 150 are communicatively coupled, for example, via a wireless connection, e.g., BLUETOOTH, or a wired connection, e.g., Universal Serial Bus (USB). A wireless connection between the handheld device 110 and the camera 150 requires at least one of the handheld device 110 and the camera 150 be a wireless access point and the other a wireless station. In some embodiments, the camera 150 operates as a wireless access point and the handheld device 110 operates as a wireless station. In these embodiments, the handheld device 110 connects to a single camera 150 and can remotely configure and operate the camera 150 in real time. In other embodiments, the camera 150 operates as a wireless station and the handheld device 110 operates as a wireless access point. In these embodiments, the handheld device 110 can connect to multiple cameras 150 and can remotely configure and operate the multiple cameras 150 in real time.

The handheld device 110 is physically coupled with the camera 150, or a housing thereof. Specifically, the mounting surface 130 physically couples the handheld device 110 with the camera 150. The mounting surface 130 includes a device coupler 132 configured to releasably couple with the camera 150. In one example, the device coupler 132 can include two or more protruding fingers 134 with an opening through them through which a bolt 136 passes through to couple with a nut (not shown). In this example, the camera 150, or housing thereof, also includes two or more protruding fingers to reciprocally and releasably (via bolting mechanism) engage with the two or more protruding fingers of the device coupler 132. In some embodiments, the handheld device 110 can be physically remote from the camera 150. In these embodiments, the handheld device 110 and the camera 150 are only communicatively coupled via the handheld device processing unit 120 and the camera processing unit 152.

The rotating membrane 114 is a cylindrical membrane including a plurality of sides and plurality of switches 118. Each side of the rotating membrane 114 includes several switches 118. Each side of the rotating membrane 114 maps to a particular mode of the camera 150, and the switches 118 of each side map to settings for the particular mode the side maps to. Examples of modes of the camera 150 include photo mode, video mode, multi-shot mode, playback mode and setup mode. The sides of the rotating membrane 114 enable the user of the handheld device to remotely configure a mode of the camera 150. The rotating membrane 114 includes a knob 116 which enables the user of the handheld device 110 change from one side of the rotating membrane 114 to another thereby remotely changing from one mode of the camera 150 to another. The rotating membrane 114 can be such that only one side of the plurality of sides is available to the user of the handheld device 110 at any one time. In this manner, the user of the handheld device 110 can only select from a subset of switches 118 of the plurality of switches 118 of the rotating membrane 114. FIG. 1 illustrates one side (e.g., photo mode) of the plurality of sides of the rotating membrane 114, the side including switches 118. Each side of the rotating membrane 114 can include a different or the same number of switches 118. The user of the handheld device 110 selects between different modes of the camera 150 by rotating the knob 116 until a desired side of the rotating membrane 114 is available to the user. The rotating membrane 114 communicates a selected side with the handheld device processing unit 120.

The switches 118 enable the user of the handheld device 110 to remotely configure specific settings to the camera 150. In one embodiment, the switches 118 are membrane switches. Membrane switches are electrical switches for turning a circuit, or portion thereof, on and off. Unlike mechanical switches, membrane switches are versatile and inexpensive. The switches 118 are thin, environmentally sealed, robust, and assembly friendly. The switches 118 can include a backlight implemented using light emitting diodes (LEDs), optical fiber, electroluminescent (EL) lamps, or other conventional components. The switches 118 can be organized in an array where each column corresponds to a different side of the rotating membrane 114 and each row corresponds to a different switch of each side of the rotating membrane. The switches 118 communicate with the handheld device processing unit 120 to remotely configure specific settings to the camera 150. Furthermore, the handheld device 110 includes the trigger 112. Similar to the switches 118, the trigger 112 enables the user of the handheld device 110 to remotely configure specific settings to the camera 150. The trigger 112 can communication with the handheld device processing unit 120 via a Hall effect sensor or a reed switch.

The handheld device 110 can further include feedback features (not shown). The feedback features can provide visual, audio, and/or haptic feedback to the user of the handheld device 110. The feedback features can confirm a current side of the rotating membrane 114, a selection one of the switches 118, a selection of the trigger 112, or that the camera 150 received a command from the handheld device 110. The feedback features can provide visual feedback via light emitting diodes (LEDs), audio feedback via speakers (e.g., by outputting an audible tone or beep or by verbalizing a current selection), and haptic feedback via haptic sensors.

The camera 150 is a limited input camera including a plurality of modes, wherein each mode includes a plurality of settings. The camera 150 can include a single select button for a user of the camera 150 to use to navigate complex configuration settings on the camera 150. As previously mentioned, the plurality of modes of the camera 150 can include photo mode, video mode, multi-shot mode, playback mode and setup mode. Each mode includes several settings, and each setting can include further settings.

The camera 150 includes a camera processing unit 152 to communicatively couple with remote devices (e.g., the handheld device 110). Similar to the handheld device 110, the camera 150 can be shockproof and/or waterproof. For example, the internal of the camera 150 can be structured to absorb shock vibration. Further by way of example, the camera 150 can include waterproof seals at any opening areas that prevent passage of liquid. In addition, as previously mentioned, the camera 150 can be in a housing and the camera 150, or housing thereof, can include two or more protruding fingers to reciprocally and releasably (via bolting mechanism) engage with the two or more protruding fingers of the device coupler 132 of the handheld device 110.

System Overview

Figure 2:
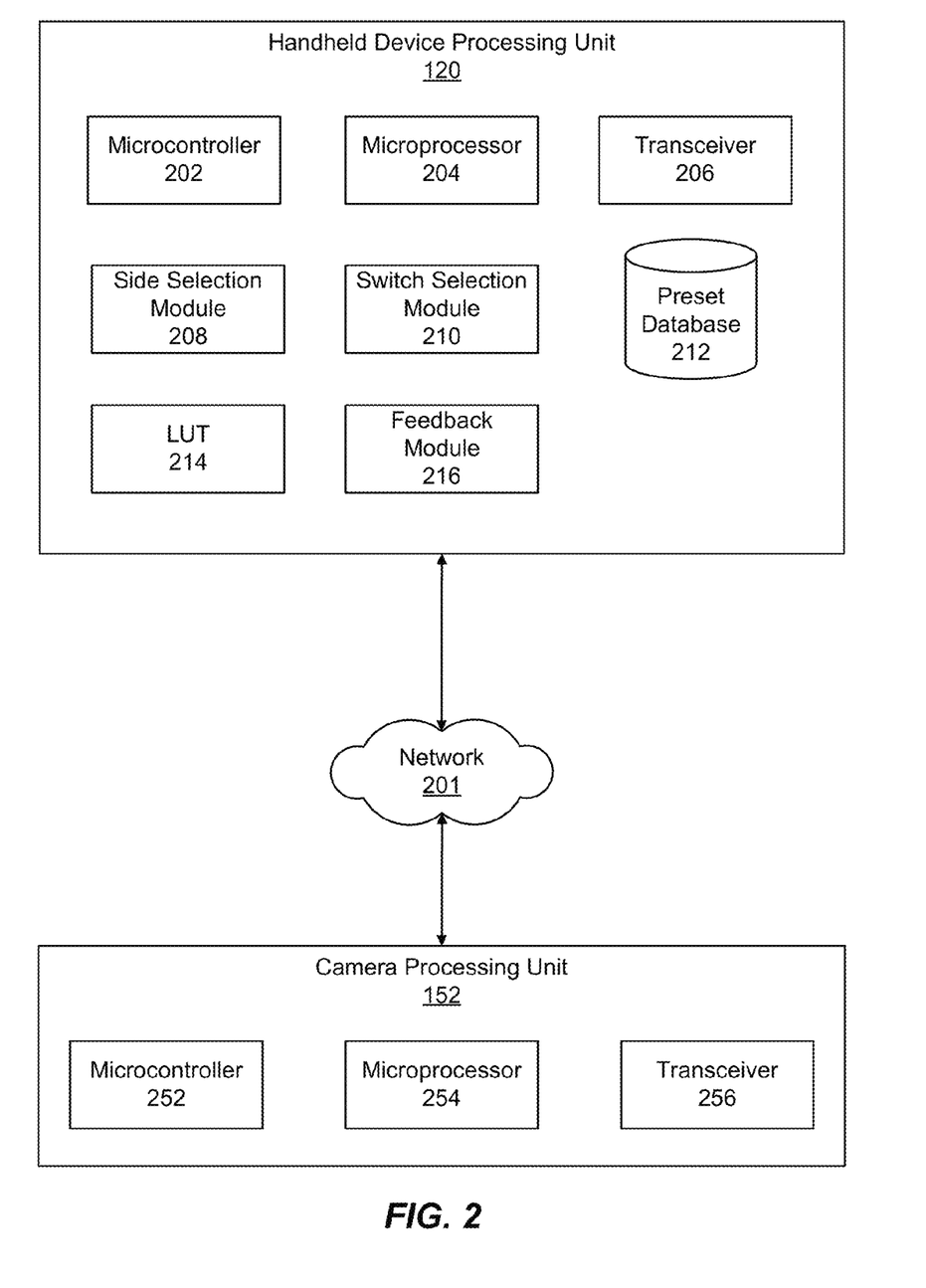
FIG. 2 is a block diagram of a computing environment including a handheld device processing unit and a camera processing unit, according to one embodiment.

Turning now to FIG. 2, it illustrates a block diagram of a computing environment including the handheld device processing unit 120 and the camera processing unit 152, according to one example embodiment. The handheld device processing unit 120 and the camera processing unit 152 can be communicatively coupled by a computer network 201 despite the handheld device 110 and the camera 150 being physically remote from one another. The network 201 can be any network(s), including but not limited to a local area network (LAN), a metropolitan area network (MAN), a wide area network (WAN), a personal area network (PAN), a mobile wired or wireless network, a private network, a virtual private network, multi-frequency network (e.g., radio frequency (RF) network) or combination thereof.

The handheld device processing unit 120 in this example includes a microcontroller 202, a microprocessor 204, a transceiver 206, a side selection module 208, a switch selection module 210, a preset database 212, a lookup table (LUT) 214, and a feedback module 216.

The side selection module 208 receives rotational information from the knob 116 and determines a selected side of the rotating membrane 114. The selected side corresponds to the side of the rotating membrane 114 available to the user of the handheld device 110. The switch selection module 208 receives a selection of a switch 118 or the trigger 112 of the rotating membrane 114.

The microcontroller 202 and the microprocessor 204 conduct a lookup via the LUT 214 to determine a command stored in the preset database 212 corresponding to the selected side, switch 118, or trigger to send to the camera 150.

The LUT 214 maps each side of the rotating membrane 114 to a particular mode of the camera 150, maps the trigger 112 and the switches 118 of each side of the rotating membrane 114 to settings of the camera 150 for the particular mode of the side. Referring briefly to FIG. 3, the LUT 214 maps first through fifth sides of the rotating membrane 114 to a photo mode, a video mode, a multi-shot mode, a playback mode, and a setup mode of the camera 150, respectively. The LUT 214 can include additional or fewer sides depending on the modes of the camera 150 and the plurality of sides of the rotating membrane 114. Furthermore, the LUT 214 maps the switches 118 each of the first through fifth sides of the rotating membrane 114 to one or more settings of the camera 150. The LUT 214 also maps the trigger 112 to one or more settings of the camera 150. In some embodiments, the LUT 214 is stored in a database (e.g., the preset database 212) which is stored in memory.

The preset database 212 stores commands to configure the camera 150 to a particular mode and commands corresponding to one or more settings of the camera 150. The preset database 212 can include a lookup table mapping one or more settings to one or more commands.

The feedback module 216 communicates with the feedback features of the handheld device 110. The feedback module 216 enables the LEDs, speaker, and/or haptic sensors to confirm the current side of the rotating membrane, the selection of one of the switches or the trigger, and/or that the camera 150 received a selection of a mode or setting from the handheld device 110. For example, the feedback module 216 can enable the backlight of a switch 118 after the feedback module 216 confirms the switch selection module 210 received a selection of the switch 118. In this manner, the feedback module 216 can provide visual feedback to the user indicating the selection of the switch 118 was recorded. The feedback module 216 similarly provides audio and haptic feedback.

The transceiver 206 transmits commands to the camera 115. The commands stored the preset database 212 include information for the camera 150 to apply one or more settings. The transceiver 206 can transmit additional commands including authentication/pairing information. The transceiver 206 includes components to communicate via the network 201.

In one embodiment, the switches 118 of the handheld device 110 are programmable. The user of the handheld device 110 can use a personal computer (not shown) to program the switches 118. The user can connect the personal computer to the handheld device 110 via the network 201. The user can use an application, including a graphical user interface, on the personal computer to program the switches 118 to create user-settings or to modify existing settings. In programming the switches, the LUT 214 is modified to reflect the user programmed mapping of switches 118 to settings of the camera 150. The controller 202 and the microprocessor 204 program a switch 118 by remapping the switch 118 to a different setting in the LUT 214. In other embodiments, the user can program the switches 118 using the handheld device 110.

Similarly, the user of the handheld device 110 can use the personal computer to update the firmware of the handheld device 110. Updating the firmware can include modifying the preset database 212 to update the existing commands and/or to include additional commands. The existing commands may change if the communication protocol defined by the camera 150 is updated or otherwise modified. The additional commands may have been introduced in a firmware update for the camera 150 and can be pushed to the handheld device 110 via a firmware update to the handheld device 110. The firmware update of the handheld device 110 enables the handheld device 110 to communicate the new commands to the camera 150.

The camera processing unit 152 includes, among other components, a microcontroller 252, a microprocessor 254, and a transceiver 256. Each of these components can be implemented with hardware circuits that generate signals. The transceiver 256 receives a command from the handheld device 110. The microcontroller 252 and microprocessor 254 configure the camera 150 according to the information included in the received command. The transceiver 256 further transmits a confirmation signal to the handheld device 110 indicating successful receipt of the command. The transceiver 256 includes components to communicate via the network 201.

Interaction Example

Figure 4:
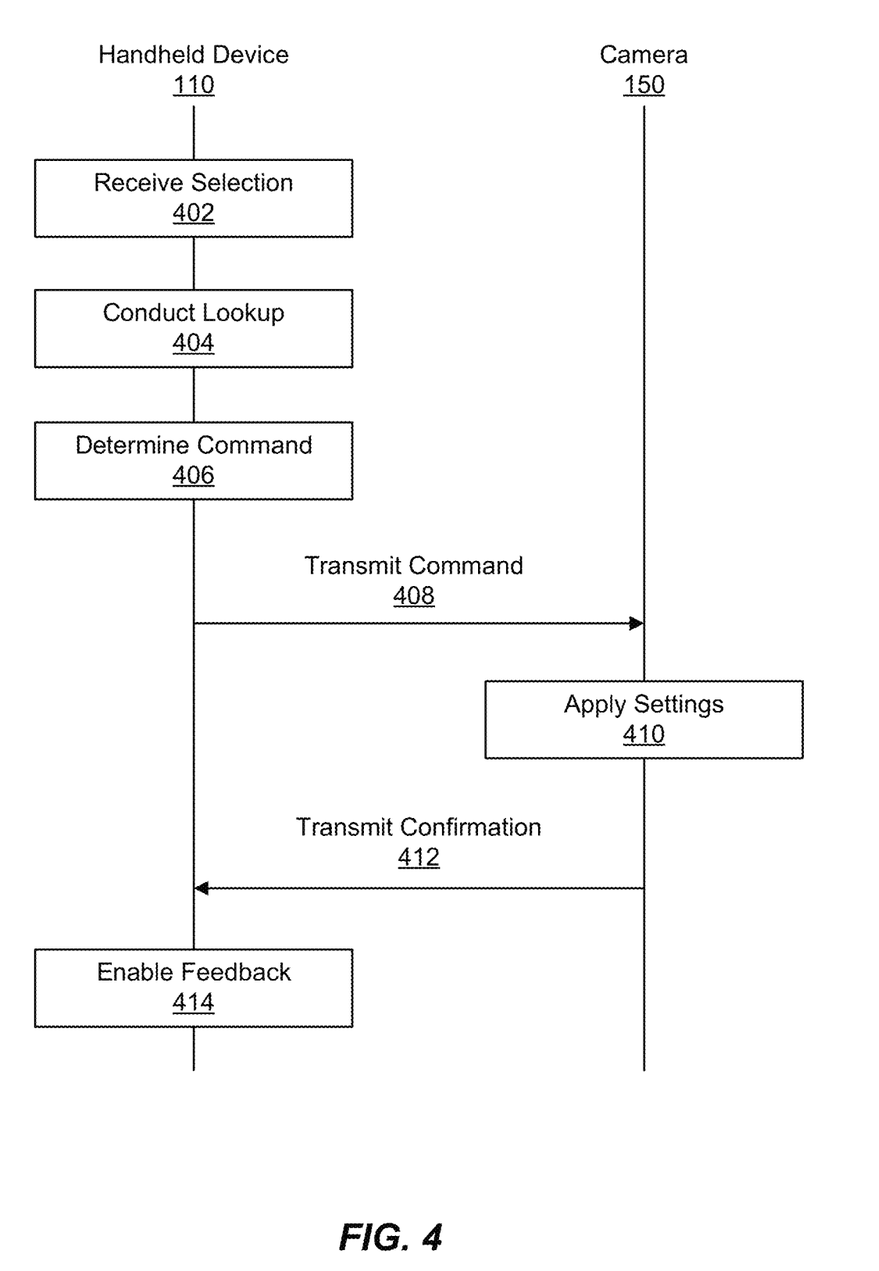
FIG. 4 illustrates a flow chart of a method for transmitting a command from a handheld device to a camera, according to one embodiment.

FIG. 4 illustrates an interaction diagram for sending a command from the handheld device 110 to the camera 150, according to one embodiment.

The side selection module 208 of the handheld device 110 receives 402 rotational information from the knob 116 indicating a selection of a side of the rotating membrane 114. The microcontroller 204 and microprocessor 204 conduct 404 a lookup via the LUT 214 and determine 406 a command stored in the preset database 212 corresponding to the selected side. The transceiver 206 of the handheld device 110 transmits 408 the determined command to the camera 150. The camera 150 applies 410 one or more settings included in the received command. The transceiver 256 of the camera 150 transmits 412 a confirmation signal to the handheld device 110 indicating the camera 150 received and applied the command successfully. The feedback module 216 of the handheld device 110 enables 414 the feedback features of the handheld device to indicate to the user of the handheld device 110 that the camera 150 applied the one or more setting mapped to the selected side.

The handheld device 110 and the camera 150 interact similarly when the switch selection module 210 of the handheld device 110 receives a selection of a switch 118 or the trigger 112.

Computing Machine Architecture

Figure 5:
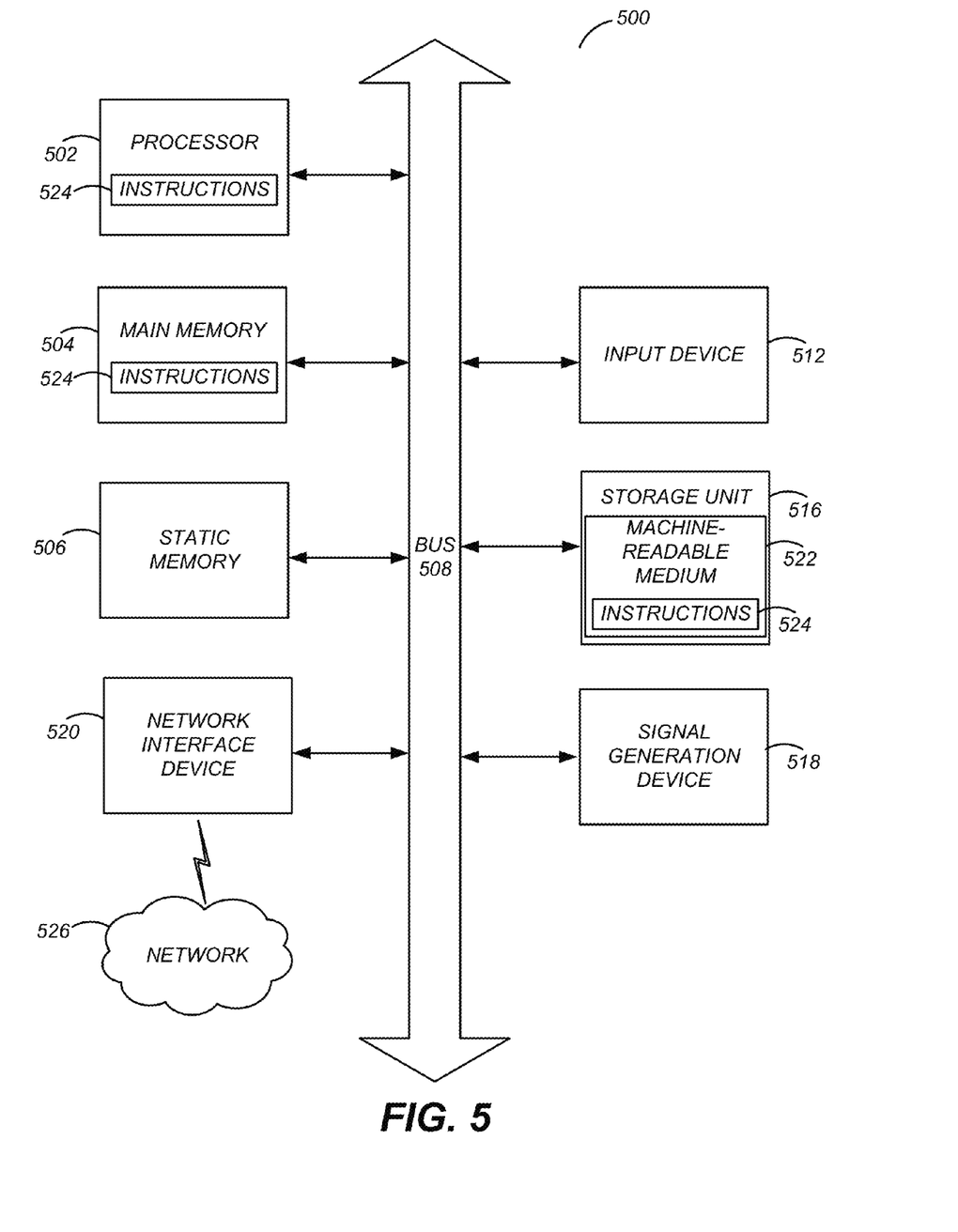
FIG. 5 illustrates one embodiment of components of an example machine able to read instructions from a machine-readable medium and execute them in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which instructions 524 (e.g., software) for causing the machine to perform any one or more of the methodologies discussed herein may be executed. In alternative embodiments, the machine operates as a standalone device or may be connected (e.g., networked) to other machines. In a networked deployment, the machine may operate as a peer machine in a peer-to-peer (or distributed) network environment.

The machine may be a handheld device processing unit 120, a camera processing unit 152, or any machine capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include input device 512 (e.g., trigger 112, switches 118, knob 116), a storage unit 516, a signal generation device 518 (e.g., a feedback features), and a network interface device 520 (e.g., transceivers 206 and 256), which also are configured to communicate via the bus 508.

The storage unit 516 (e.g., preset database 212 and LUT 214) includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially describe a camera controller system 100 for remotely configuring the camera 150 via the handheld device 110. The user of the handheld device 110 can quickly and easily configure specific settings of the coupled camera 150.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for configuring specific settings of a communicatively coupled camera via a handheld device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed it:

1. A handheld camera mount configured to be in communication with a camera, the handheld camera mount comprising:
   a mounting feature connecting a camera housing to the handheld camera mount, the mounting feature comprising inner locking portions to fixably engage with the camera housing; and
   a handle housing configured to secure a rotating membrane, a communication subsystem and a printed circuit board having a processor and a non-transitory computer-readable storage medium;
   the rotating membrane comprising a plurality of sides, wherein each side includes a subset of switches of a plurality of switches individually exposable for interaction; and
   the non-transitory computer-readable storage medium having instructions stored thereon that, when executed, cause the processor to:
   receive a selection of a switch of the plurality of switches,
   conduct a lookup in a lookup table for a first setting mapped to the selected switch, the lookup table stored in a database in memory and mapping the plurality of switches to a plurality of settings of the camera, and
   transmit, via the communication subsystem, a first command to the camera, the first command including the first setting.

2. The handheld camera mount of claim 1, wherein the lookup table further maps each side of the plurality of sides of the rotating membrane to a mode of the camera.

3. The handheld camera mount of claim 2, wherein the instructions that, when executed, cause the processor to:
   receive a selection of a side of the plurality of sides;
   conduct a lookup in the lookup table for a second setting mapped to the selected side; and transmit, via the communication subsystem, a second command to the to the camera, the second command including the second setting.

4. The handheld camera mount of claim 1, wherein the instructions that, when executed, cause the processor to:
receive a confirmation signal indicating the command was received by the camera.

5. The handheld camera mount of claim 4, further comprising a plurality of feedback features including one or more light emitting diodes, speakers, and haptic feedback sensors.

6. The handheld camera mount of claim 5, wherein the instructions that, when executed, cause the processor to:
enable at least one of the feedback features responsive to receiving the selection of the switch.

7. The handheld camera mount of claim 5, wherein the instructions that, when executed, cause the processor to:
enable at least one of the feedback features responsive to receiving the confirmation signal.

8. The handheld camera mount of claim 1, wherein the plurality of switches are programmable.

9. The handheld camera mount of claim 8, wherein the instructions that, when executed, cause the processor to:
program a switch of the plurality of switches by re-mapping the switch to a setting in the lookup table.

10. The handheld camera mount of claim 1, further comprising an actuation control and wherein the instructions that, when executed, cause the processor to:
receive a selection of the actuation control;
conduct a lookup in the lookup table for a third setting mapped to the actuation control, wherein the lookup table further maps the actuation control to settings of the camera;
transmit a third command to the camera, the third command including the third setting.

11. A non-transitory computer readable storage medium configured to store instructions, the instructions that, when executed, cause the processor to:
receive, at a handheld device, a selection of a switch of a plurality of switches;
conduct a lookup in a lookup table for a first setting mapped to the selected switch, the lookup table stored in a database in memory and mapping the plurality of switches to a plurality of settings of a camera;
transmit, via a communication subsystem of the handheld device, a first command to the camera, the first command including the first setting;
receive, at the handheld device, a selection of a side of a plurality of sides;
conduct a lookup in the lookup table for a second setting mapped to the selected side, wherein the lookup table further maps each side of the plurality of sides to a mode of the camera; and
transmit, via the communication subsystem, a second command to the camera, the second command including the second setting.

12. The non-transitory computer readable storage medium of claim 11, further comprising instructions that, when executed, cause the processor to:
enable at least one of a plurality of feedback features of the handheld device responsive to receiving the selection of the switch,
wherein the plurality of feedback features include one or more light emitting diodes, speakers, and haptic feedback sensors.

13. The non-transitory computer readable storage medium of claim 11, further comprising instructions that, when executed, cause the processor to:
receive, at the handheld device, a confirmation signal indicating the first command and the second command were received by the camera.

14. The non-transitory computer readable storage medium of claim 13, further comprising instructions that, when executed, cause the processor to:
enable at least one of a plurality of feedback features of the handheld device responsive to receiving the confirmation signal,
wherein the plurality of feedback features include one or more light emitting diodes, speakers, and haptic feedback sensors.

15. The non-transitory computer readable storage medium of claim 11, further comprising instructions that, when executed, cause the processor to:
program a switch of the plurality of switches by re-mapping the switch to a setting in the lookup table.

16. The non-transitory computer readable storage medium of claim 11, further comprising instructions that, when executed, cause the processor to:
receive, at the handheld device, a selection of an actuation control;
conduct a lookup in the lookup table for a third setting mapped to the actuation control, wherein the lookup table further maps the actuation control to settings of the camera;
transmit, via the communication subsystem, a third command to the camera, the third command including the third setting.

* * * * *